Aug. 26, 1969 W. P. GUENTHER 3,463,313
ASPIRATING MACHINE AND METHOD
Filed Sept. 15, 1967 2 Sheets-Sheet 1
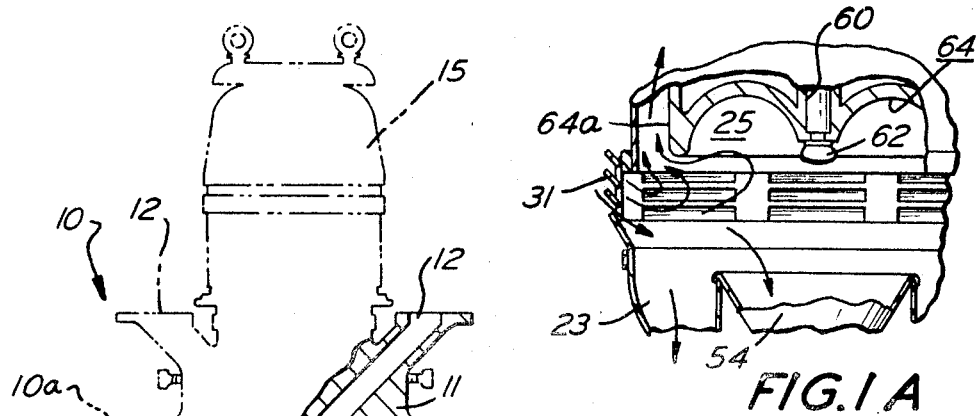
FIG.1A
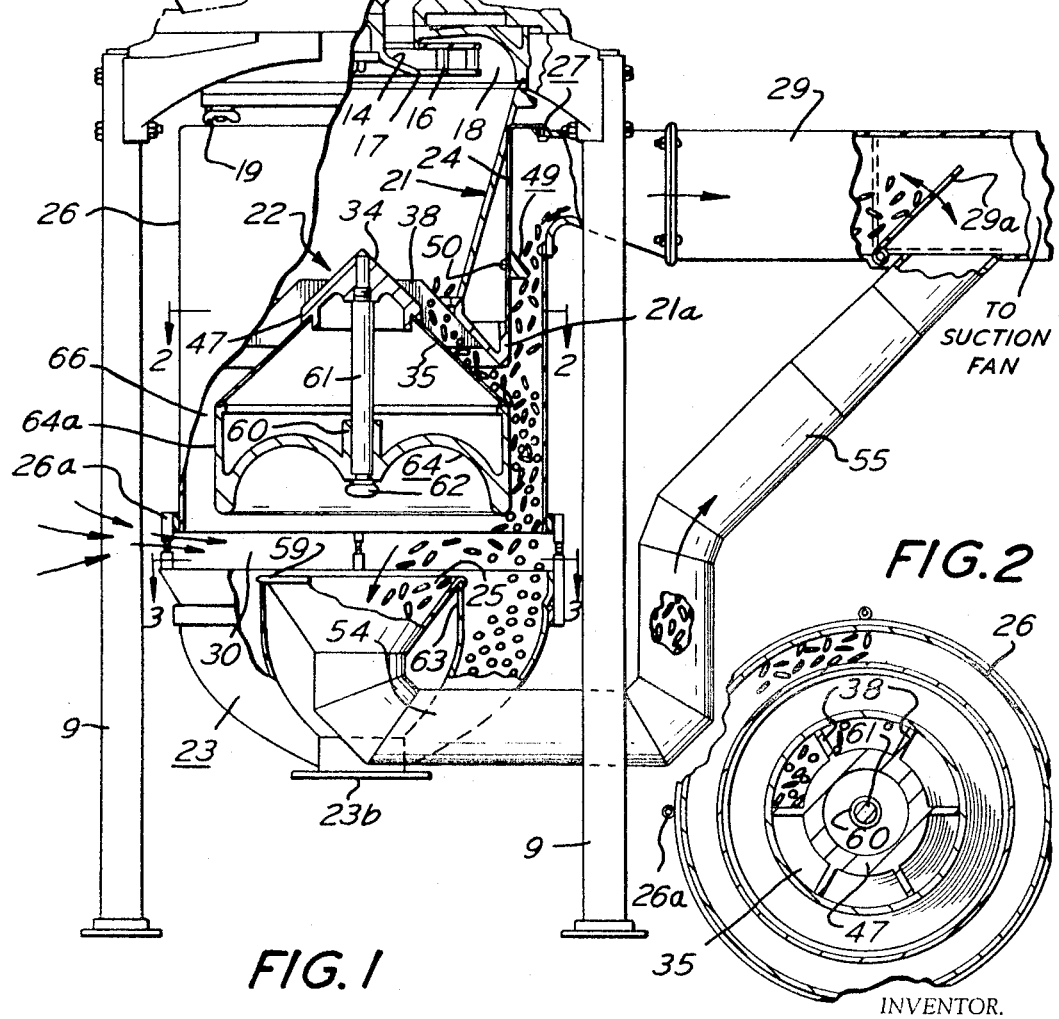
FIG.1
FIG.2
INVENTOR.
WOLFGANG PETER GUENTHER
BY
Maleson, Kimmelman & Ratner
ATTORNEYS.

INVENTOR.
WOLFGANG PETER GUENTHER

BY

Maleson, Kimmelman & Ratner
ATTORNEYS.

United States Patent Office 3,463,313
Patented Aug. 26, 1969

3,463,313
ASPIRATING MACHINE AND METHOD
Wolfgang Peter Guenther, Cheshire, Conn., assignor to Entoleter, Inc., Hamden, Conn., a corporation of Delaware
Filed Sept. 15, 1967, Ser. No. 668,045
Int. Cl. B07b 7/01
U.S. Cl. 209—135                                      7 Claims

ABSTRACT OF THE DISCLOSURE

A centrifugal impacting mill particle classifier is shown for milling soya beans and the like. Precracked soya beans are fed to the mil, which splits the beans into hulls and meats. The mixture of the hulls and meats passes down and outwardly over a conical distributor and over a first aspirating gap. In this gap, there is an upward draft of air which carries most of the larger but lighter hulls outside the apparatus. The meats and the residual hulls proceed downward past a peripheral opening in the apparatus through which ambient air flows inwardly toward the center of the apparatus. This inward flow is angled at 90°–120° with respect to the flow of meats and residual hulls and carries the residual hulls to an inner suction means which removes them from the apparatus. The heavier meats fall down outwardly of the residual hulls and are collected in a hopper or bag.

BACKGROUND OF THE INVENTION

This invention relates to apparatus and a method for classifying flowable particles such as soya beans or the like. In particular, the invention relates to apparatus and a method for classifying particles having different air resistance characteristics after the mixture has been processed as by milling, for example.

In Dodds Patent No. 2,645,345, a machine for aspirating cereal grains immediately after the milling thereof is taught. In that patent there is disclosed an apparatus for centrifugally flinging whole grain at high velocity in a uniformly highly dispersed condition against impact surfaces. The impact causes the kernel to break open along the lines of least cleavage thereby dislodging the germ from its kernel. Progressive treatments separate or break away the endosperm from the hulls. The patent discloses a machine in which the mixture of particles falls, after milling, upon a conical surface and thence across an annular zone wherein there is an upward flow of gas such as air. The upward flow of air passes through the mixture at a carefully predetermined volume and velocity to lift from the mixture the lighter hull particles and any other entrained light impurities, these "fines" being collected exteriorly of the machine. At the same time the heavier endosperm and germ particles fall into a collecting hopper. The classifying action of that apparatus is accomplished substantially in a single aspirating step.

While this apparatus has been commercially successful for milling and aspirating cereal grains, its application to the milling and classifying of soya beans has been less than perfect. It is believed that this has been due to the fact that when the mixture of the larger hulls and the smaller, denser meats moved across the annular aspirating zone, not all of the hulls or other light particles were wafted upward by the rising flow of gas. This was because some of the hulls were physically trapped by or entrained with the heavier meats and went downward with them.

SUMMARY OF THE INVENTION

I have found that a significant improvement in this general type of apparatus may be accomplished by making certain changes in its structure with a consequent alteration in its method of operation. The main improvement is effected by providing below the primary aspirating zone, which functions in the same general manner as taught in the previously mentioned patent, a secondary aspirating zone. This secondary aspiration is accomplished by providing an essentially lateral inflow of air downstream of the primary aspirating zone. This lateral flow of air tends to carry inwardly lighter ones of the particles in the mixture that has already passed downwardly through the primary aspirating zone. Inwardly of this secondary zone there is provided suction means for drawing off these laterally entrained lighter particles. The coarser particles of the mixture remain toward the outside of the secondary zone and fall, as in the earlier patent, downward into a collecting conduit or hopper located outwardly of the central suction means.

DESCRIPTION OF THE DRAWINGS

FIGURE 1 is a side elevation of one form of the apparatus according to my invention with certain parts cut away and certain parts being shown in cross-section.

FIGURE 1A is a fragmentary enlargement of a part of another form of the present invention showing the action of the air currents in the secondary aspirating zone.

FIGURE 2 is a cross-sectional view taken along the section line 2—2 in FIGURE 1.

Figure 3:
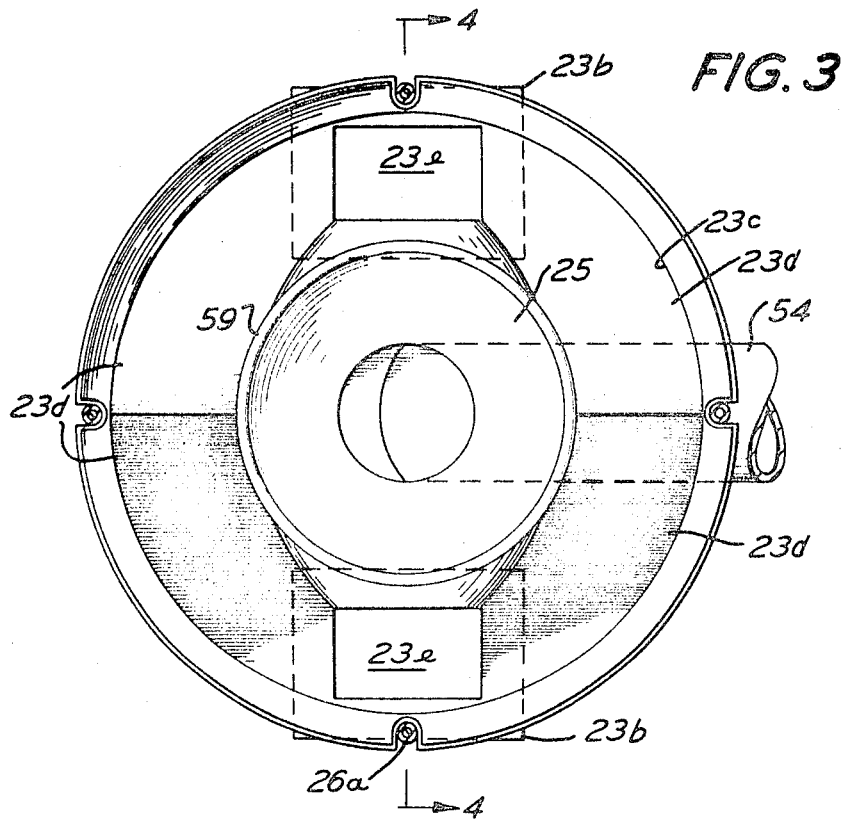
FIGURE 3 is a plan view of part of the apparatus shown in FIGURE 1 and taken from the view line 3—3 thereon in the direction indicated.

Referring now to the various figures of the drawings, one embodiment of the invention is generally indicated at the numeral 10. Its upper portion can be quite similar to the corresponding portion of the apparatus shown in the Dodds patent previously mentioned. It includes an upper casing portion 11 having a pair of inlets 12, one of which is shown in cross-sectioon at the right, there being a corresponding one on the left side thereof. A product to be aspirated or classified is applied to the apparatus through these inlets into the interior of the apparatus. The casing also includes a base portion 10a which rests upon legs 9.

A rotor 14 is rotatably mounted within the casing 11 and comprises in the exemplary form shown, an upper annular portion 15 and a lower generally disc-shaped portion 17. The upper annular member 15 is supported by one or more circular rows of impacting elements 16 which are fastened between it and the upper surface of the lower member 17. The rotor 14 is so mounted that the inflowing product is conducted by the surfaces of the inlets 12 through the annular area lying inwardly of the inner edge of the upper rotor member 15. The input product falls upon the inclined portion of the upper surface of the lower member 17 and is flung outwardly with great force against and ultimately between the impactors 16, then against the surface of the so-called "liner" 18. The impactors 16 may comprise one or more rows of cylindrical, hardened steel "impactors" or may comprise, as shown in the aforesaid Dodds Patent, a plurality of radially disposed vanes or blades. The liner 18 may be of any desired construction such as being corrugated or smooth-surfaced, or may even comprise another circular array of impactors.

The milling portion of the machine 10 just described does not constitute part of the present invention. The present invention concerns only apparatus and method for classifying any available mixture of flowable particles. The mixture need not be milled in the apparatus. It may be obtained in any fashion and applied to the classifying portions of the apparatus in any desired way. For example, the mixture could merely be dropped onto the distributing subassembly from above.

As a result of the action of the centrifugal impact mill, illustrated for exemplary purposes herein, if the input product is precracked soya beans they are fractured along the lines of least resistance. As a result, hull portions of varying size are broken loose from the meats. This mixture of particles of various sizes the larger but lighter hulls and the smaller but denser meats, falls downward along the inwardly-inclined walls of the shell 21, possibly flowing in the form of a slight swirl as a result of the rotary action imparted to it by the centrifugal mill and gravity. The shell 21 is mounted to the bottom of the liner 18 by any appropriate means. If it is desired to make it detachable the apparatus may be constructed at its upper edges to be bolted or otherwise releasably secured to the liner.

An outer cylinder 24 is fastened by bolt subassembly 27 or in any other desired manner near the upper end of the shell 21. A central, generally conical distributing subassembly indicated generally at numeral 22 is fastened to the shell 21. The subassembly 22 is joined to the shell 21 by any desired means. One way, shown in the Dodds patent, is to provide a number of bosses attached to the lower outer surface of the shell 21 and a corresponding number of bosses toward the tips of blades 38. Bolts can then be passed through these aligned bosses to provide the necessary coupling. The distributing subassembly 22 consists of a conical head portion 34 having integral therewith a plurality of blades or baffles 38 radially disposed around it and which are fixed to the outwardly inclined inner surface of the lower shell portion 21a. The subassembly also includes a frustoconical wall portion 35 and a lower air distributing portion 64 comprising an annular, generally concave surface which is formed in its bottom surface.

The head portion 34, the baffles 38 and portion 21a may be made of a single casting. There may be, for example, eight of these baffle extending downwardly and outwardly of the head 34. They act to minimize or eliminate any swirling or cyclonic action of mixture of particles as it passes downward on the inside surface of the shell 21. In this way the mixture can flow downward over the upper surface of the portion 35 in substantially uniform thin, unidirectional streams at right angles to the rising air currents in the annular classifying gap 65.

The head portion 34, wall 35 and portion 64 are held together by a large stud 61 screwed into head 34 through the center of portion 64. A screw 62 is threaded into the lower end of distributor 64 to enable the latter to be separately removed.

A baffle 49 is fastened to wall 24 by screws 50. This baffle serves to keep the air velocity in the primary aspirating gap substantially uniform as explained in the Dodds patent.

SECOND ASPIRATING SUBASSEMBLY

The coarse hopper 23 has a generally annular outline as shown in FIG. 3. It is detachably suspended from the bottom edge of the housing 26 by threaded rod subassemblies 26a. These rods can be adjusted to provide any desired spacing or gap 30 between the top of the hopper 23 and the bottom of the housing 26. This space or gap is one of the important parts of the present invention inasmuch as it enables the inflow of a lateral stream of air which accomplishes a secondary aspirating effect resulting in improved performance. A spacing of 2"±1" has been found to work satisfactorily, although it can vary depending upon the rate at whch the air is pumped through the apparatus, and upon many other factors including feed rate, internal dimensions and geometry, nature and sizes of particles, etc.

The hopper 23 comprises an outer wall 23c which tapers down to two flanged portions 23b to which any collection means such as a bag or box may be affixed. The inner boundary of the hopper 23 is the wall 63 which has a circular cross-section of diminishing radius at it approaches the flanges 23b. Whatever coarse particles fall into the coarse hopper after passing gap 30 will fall upon the angled floor portions 23d which have apical junctions toward the top of the hopper. Their lower portions terminate near the flanges 23b. Consequently the coarse particles will be guided by portions 23d toward the openings 23e defined by the flanges 23d.

Figure 4:
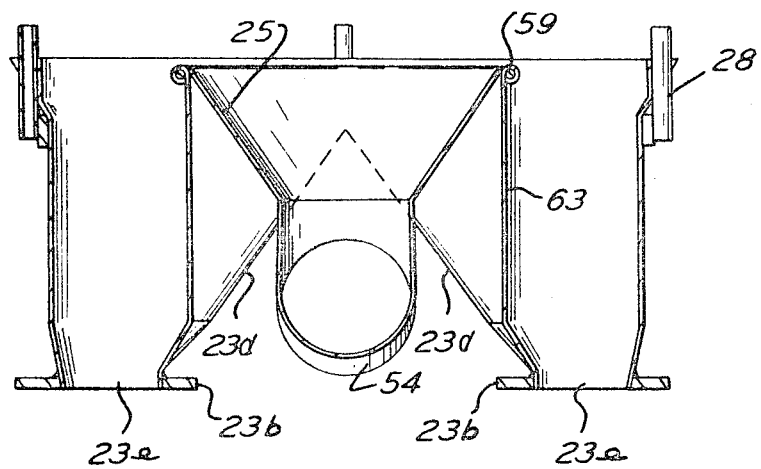
FIGURE 4 is a sectional view of the apparatus shown in FIGURE 3 taken along the section line 4—4 of FIGURE 3.

Whatever "fines" or hulls are carried downward by the heavier meats and are driven inwardly by the laterally inflowing air through the gap 30 are sucked down into the funnel-shaped outlet 25. Outlet 25 has a lip 59 which curls over upon and is supported by the wall 63 as explained above. Connected to the outlet 25 is a generally horizontal conduit 54 which passes horizontally outwardly under the angled floor portions 23d as shown in FIGS. 3 and 4. The conduit portion 54 is joined to an upwardly angled conduit portion 55 which is connected to an aperture in the horizontal exhaust conduit 29 as shown in FIG. 1. Located in the exhaust conduit 29 is an adjustable damper 29a which proportions the relative amounts of suction drawn through the conduits 29 and 55, respectively, to the suction fan connected thereto. It is this fan which performs the initial aspiration by creating an upward draft of air in the annular first aspirating gap 66. The same fan causes the inrush of ambient air through the second aspirating gap 30 which deflects the hulls inwardly toward the funnel-shaped outlet 25.

It should be remarked that the hulls of soya beans are relatively flat and light compared to the heavier meats. This relative flatness of the hulls makes them more subject to the inrushing air through gap 30 compared with the lesser deflectability of the smaller and denser meats.

OPERATION

When used for milling and aspirating soya beans, for example, the precracked soya beans are applied to the upper milling portion of the apparatus via the inlet chutes 12. They are flung out against the impactors 16 by rotation of the rotor 14 and hit liner 18 whence they fall downward and inwardly on the inside surface of the shell 21. Any swirling or vertical movement of the mixture of particles is mostly dissipated by their passage between the distributing vanes 38 which tend to feed the mixture downwardly and outwardly in the form of a uniform thin layer over the upper surface of the conical member 35. From there they pass outwardly into the first aspirating zone or gap 66. Since the suction fan is pulling air inwardly through the second aspirating gap 30, part of it will be drawn upward through the primary aspirating gap 66 whereas the other part will be moving inwardly and downwardly toward the funnel inlet 25. The upward rush of air in the first aspirating zone carries most of the lighter and larger cross-sectional hull particles with it into the conduit 29.

Some of these hull particles, however, will be caught between the denser meats and dragged downwardly into the region of the second aspirating gap 30. The inward movement of air at this point will drive the lighter hull portions inwardly toward the funnel inlet 25 for removal with the other hull portions (from gap 66) in the direction of the suction fan. The meats will fall upon the angled floor portions 23d which will conduct them toward the openings 23e in the two flanged portions 23b and to the coarse-fraction collecting containers.

FIGURE 1A shows a variation in the form of the invention. Around the gap 30 are provided a plurality of downwardly and inwardly angled vanes 31 which give the incoming air a greater downward component than was the case in the embodiment of FIG. 1. This assists in steering the meats toward the funnel outlet 54.

It should be noted that the milling portion of the apparatus need not be of the centrifugal impact type for practicing the present invention. Any mill may be used which produces a mixture of various-sized solid particles. Actually no mill is requisite to the present invention since the novelty resides in the provision of a second lateral aspirating action downstream of a first aspirating zone.

Still other variations which do not depart from the essence of the invention and applications other than the one example explained in detail will occur to one skilled in the art upon reading of the specification and perusal of the drawings herein. Consequently, it is desired that the invention herein be limited solely by the claims.

I claim:

1. A process for classifying a mixture of solid particles comprising the steps of:
    (a) passing said mixture through a first zone in which there is a flow of gas upwardly whereupon said gas entrains and carries upwardly a first portion of the lighter particles of said mixture,
    (b) enabling the residue of said mixture to pass downwardly,
    (c) subjecting said residue downstream of said first zone to a current of gas in a second zone moving primarily laterally inwardly of the path of said residue thereby to cause a second portion of said lighter particles to be displaced laterally inwardly of the heavier particles therein,
    (d) collecting said heavier particles after said second portion has been displaced laterally inwardly,
    (e) collecting said second portion in a separate stream of said gas inwardly of said second zone.

2. The process according to claim 1 wherein said current of gas moving laterally inwardly also is deflected downwardly.

3. Apparatus for classifying a mixture of particles comprising:
    (a) means for passing said mixture in a first zone in which there is an upward flow of a gas whereupon siad gas entrains and carries away a first portion of the lighter particles of said mixture,
    (b) a generally annular chamber downstream of said first zone through which the residue of said mixture drops,
    (c) means for subjecting said residual mixture downstream of said annular chamber to a current of a gas in a second zone which moves laterally inwardly thereby to cause a second portion of said lighter particles to be moved laterally inwardly of the heavier particles thereof,
    (d) means for collecting the heavier particles of said residual mixture downstream of said (c) means,
    (e) means for collecting said second portion of said particles inwardly of said second zone and withdrawing them from said apparatus in a stream of gas separate from said upward gas flow.

4. The apparatus according to claim 3 wherein said (c) means includes means for deflecting said laterally inward flow of gas in a predetermined downward course.

5. The apparatus according to claim 3 wherein said upwardly and laterally moving gases are derived from the ambient air.

6. The apparatus according to claim 3 wherein said upward flow of gas and said laterally inward separate current of said gas are produced by a common suction-producing means.

7. The apparatus according to claim 6 wherein means are provided for proportioning said upward and lateral flows of gas.

References Cited

UNITED STATES PATENTS

| | | | |
|---|---|---|---|
| 82,431 | 9/1868 | Mills et al. | 209—150 X |
| 884,552 | 4/1908 | Wright | 209—134 |
| 1,535,018 | 4/1925 | Ely | 209—150 X |
| 2,529,679 | 11/1950 | Dodds | 209—150 X |
| 2,645,345 | 7/1953 | Dodds | 209—138 |
| 2,649,962 | 8/1953 | Ruemelin | 209—150 X |
| 2,766,880 | 10/1956 | Schaub et al. | 209—150 X |
| 2,795,329 | 6/1957 | Schaub | 209—139 |

FOREIGN PATENTS 87,952  8/1956  Norway.

OTHER REFERENCES

Schaub, German printed application #1,031,097, May 1958, 209–138.

TIM R. MILES, Primary Examiner

U.S. Cl. X.R.

209—139, 150